United States Patent [19]

Ueda

[11] Patent Number: 6,066,398
[45] Date of Patent: May 23, 2000

[54] POLYCARBONATE MOULDING MATERIAL FOR OPTICAL DISCS

[75] Inventor: Masaya Ueda, Hiratsuka, Japan

[73] Assignee: Mitsubishi Engineering-Plastics Corporation, Tokyo, Japan

[21] Appl. No.: 09/119,482

[22] Filed: Jul. 20, 1998

[30] Foreign Application Priority Data

Jul. 23, 1997 [JP] Japan ..................................... 9-211198

[51] Int. Cl.$^7$ ............................... B32B 5/16; B32B 3/02; B29D 17/00; B29D 11/00; H05B 6/00
[52] U.S. Cl. ........................ 428/402; 428/64.7; 264/1.33; 264/2.7; 264/478
[58] Field of Search .................................... 428/358, 359, 428/364, 402, 64.2, 64.4, 64.7; 264/1.33, 1.29, 1.34, 2.2, 2.3, 2.4, 2.7, 402, 460, 478, 479

[56] References Cited

U.S. PATENT DOCUMENTS

| | | | |
|---|---|---|---|
| 5,683,630 | 11/1997 | Inoue | ...................................... 264/1.33 |
| 5,705,105 | 1/1998 | Inoue | ........................................ 264/2.2 |

FOREIGN PATENT DOCUMENTS

| | | |
|---|---|---|
| 63-003021A | 1/1988 | Japan . |
| 07052272A | 2/1995 | Japan . |
| 07324138A | 12/1995 | Japan . |
| 08057850A | 3/1996 | Japan . |
| 09029738A | 2/1997 | Japan . |
| 11071510A | 3/1999 | Japan . |

*Primary Examiner*—Paul Thibodeau
*Assistant Examiner*—Sheeba Ahmed
*Attorney, Agent, or Firm*—David G. Conlin; Christine C. O'Day; Dike, Bronstein, Roberts & Cushman, LLP

[57] ABSTRACT

The present invention relates to a polycarbonate molding material for optical discs, comprising pellets which comprises a polycarbonate with a viscosity-average molecular weight of 10,000 to 18,000;

has an average length of 2.5 to 3.5 mm; and
has an average longer diameter of the sectional ellipse of 2.60 to 3.2 mm,
not less than 70% of said pellets having a length falling within the range of ±0.08 mm from the mean value of length and a longer diameter falling within the range of ±0.12 mm from the mean value of longer diameter.

6 Claims, No Drawings

POLYCARBONATE MOULDING MATERIAL FOR OPTICAL DISCS

BACKGROUND OF THE INVENTION

The present invention relates to a polycarbonate molding material for optical discs. More particularly, it relates to a pelletized polycarbonate molding material useful for producing transparent substrates of optical discs which are high-density recording media, by injection molding, in which the molding material is capable of molding the optical discs at high productivity with a short molding cycle in injection molding.

Since polycarbonate resins are excellent in transparency, heat resistance and low water absorption, polycarbonate resins are widely used as raw materials in optical uses, especially, for the manufacture of transparent substrates of optical discs such as CD, CD-ROM, MO, PD, CD-R, CD-RW, DVD-ROM, DVD-R and DVD-RAM. Expansion of optical disc markets in recent years has been remarkable and the productivity thereof as well as quality and precision in the manufacture of the transparent substrates of such optical discs has been regarded as important.

In manufacture of the transparent substrates which are usually produced by injection molding, it is advantageous in view of productivity that the molding cycle time be reduced. Generally, the injection molding cycle is constituted by the steps of an injection step, a dwelling step, a cooling step and a withdrawal step of the molded product. In the manufacture of CD according to the latest process, the molding cycle is set to be not more than 4.0 seconds. The molding cycle time is variable depending on the molding conditions and other relevant factors such as capacity of the molding withdrawal device. In the case where the total molding cycle time through the steps is defined to be within 4.0 seconds, the time of the cooling step must be set to be 2.0 to 3.0 seconds. Therefore, the plasticization time of the resin comes into question. Usually, the plasticization of the resin is completed within the period of cooling which follows the steps of injection and dwelling, and the shorter the waiting period till injection, the more advantageous for a "shorter tact time" in productivity.

Reduction of the substrate cooling time by enhancing the cooling efficiency of the mold is indeed one means for attaining a "shorter tact time" in productivity where the total cycle time does not exceed 4.0 seconds. However, if the cooling time is reduced excessively, the resin plasticization time may be longer than the cooling time, so that there is caused a problem of the necessity to elongate the cooling time till resin plasticization is completed despite the fact that actual cooling of the substrate is already finished. On the other hand, if the mold is opened in order to take out the molded product when plasticization is not yet completed, the resin being plasticized may flow into the sprue of the mold (fixed) integral with the screw unit, thereby causing imperfect plasticization. Thus, the reduction of the resin plasticization period is an essential requirement. The resin plasticization time may be reduced by increasing the screw speed, but increase of screw speed tends to cause air to be easily mingled into molten resin, thereby raising the risk of inducing silverstreaks on the molded product.

Usually, plasticization and metering of the resin in the molding machine are performed by melting the resin pellets at a high temperature, uniformly plasticizing the resin by rotating the screw in the cylinder at high speed while letting it backtrack, and forwarding a measured amount of molten resin ahead of the cylinder. Thus, the shorter the period in which the resin pellets are melted, the shorter the plasticization time becomes.

As a result of the present inventors' earnest studies on the melting behavior of the resin pellets, it has been found that although the melting time of the resin pellets depends on such factors as feed zone temperature of the cylinder and screw speed, the plasticization time is greatly affected by the length and diameter of the pellets, that is, by using the pellets having more specific length and diameter distributions, the plasticization time can be reduced. Further, it has been found that since the plasticization time can be shortened by uniformalizing the size of the resin pellets, it is not necessary to rotate the screw at high speed when metering the resin, whereby it is possible to avoid causing silverstreaks due to drag-in of air. The present invention has been attained on the basis of the above finding.

SUMMARY OF THE INVENTION

An object of the present invention is to provide a molding material comprising polycarbonate pellets, which is useful for producing transparent substrates for optical discs at high productivity with a short molding cycle time.

To attain the above object, in a first aspect of the present invention, there is provided a polycarbonate molding material for optical discs, comprising pellets which comprise a polycarbonate with a viscosity-average molecular weight of 10,000 to 18,000;

has an average length of 2.5 to 3.5 mm; and has an average longer diameter of the sectional ellipse of 2.60 to 3.2 mm, not less than 70% of said pellets having a length falling within the range of ±0.08 mm from the mean value of length and a longer diameter falling within the range of ±0.12 mm from the mean value of longer diameter.

In a second aspect of the present invention, there is provided a process for producing an optical disc, comprising conducting injection-molding of the polycarbonate molding material as defined in the first aspect.

In a third aspect of the present invention, there is provided a process for using the polycarbonate molding material as defined in the first aspect, comprising conducting injection-molding of the said polycarbonate molding material, thereby producing an optical disc.

DETAILED DESCRIPTION OF THE INVENTION

The present invention is described in detail below.

The optical discs to which the molding material of the present invention can be applied are not specifically defined as far as they are injection-molded, but in view of productivity and other matters, they are preferably the optical discs comprising a 0.6 to 1.2 mm thick single disc, or a pair of such discs combined, which have been obtained by injection-molding the said material under the conditions of: molding cycle=not more than 4.0 seconds; setting temperature of the cylinder of the injection molding machine=280 to 400° C.; setting temperature of the mold=50 to 140° C.

The molding material of the present invention is the pellets of a polycarbonate having a viscosity-average molecular weight of 10,000 to 18,000. These pellets are specified by the facts that the mean value of their length is 2.5 to 3.5 mm, with not less than 70% of these pellets having a length falling within the range of ±0.08 mm from the mean value of length; and that the mean value of the longer diameter (major diameter) of the sectional ellipse of the said pellets is 2.6 to 3.2 mm, with not less than 70% of these pellets having a longer diameter falling within the range of ±0.12 mm from the mean value of longer diameter.

The polycarbonate resins used for the molding material of the present invention are the polymers or copolymers obtained by a phosgene method in which various types of dihydroxydiaryl compound are reacted with phosgene, or an ester exchange method in which a dihydroxydiaryl compound is reacted with a carbonate such as diphenyl carbonate. Typical examples of such polycarbonate resins are those produced from 2,2-bis(4-hydroxyphenyl)propane (bisphenol A).

Examples of the said dihydroxydiaryl compounds include, beside bisphenol A, bis(hydroxyaryl)alkanes such as bis(4-hydroxydiphenyl)methane, 1,1-bis(4-hydroxyphenyl)ethane, 2,2-bis(4-hydroxydiphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane, and 2,2-bis(4-hydroxy-3,5-dichlorophenyl)propane; bis(hydroxyaryl) cycloalkanes such as 1,1-bis(4-hydroxyphenyl) cyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxyphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

These compounds may be used either singly or as a mixture of two or more of them. If necessary, other substances such as piperadine, dipiperidyl, hydroquinone, lesorcin, 4,4'-dihydroxydiphenyl and the like may be mixed.

Since the optical products such as optical discs are required to be minimized in optical stress, it is necessary to have the viscosity-average molecular weight of usually 10,000 to 18,000, preferably 13,000 to 16,000. The viscosity-average molecular weight (M) referred to herein is determined from the following Schnell's viscosity equation by measuring the intrinsic viscosity (η) of a solution prepared with methylene chloride as solvent by an Ostwald's viscometer.

$$(\eta) = 1.23 \times 10^{-5} M^{0.83}$$

The pellets of the molding material of the present invention need to meet the requirements that the mean value of their length is in the range of usually 2.5 to 3.5 mm, preferably 2.7 to 3.4 mm, that the mean value of longer diameter of their sectional ellipse is in the range of 2.6 to 3.2 mm, preferably usually 2.6 to 3.1 mm, and that usually not less than 70%, preferably 72% of the pellets based on the total number of pellets have a length falling within the range of ±0.08 mm from the mean value of length and a longer diameter falling within the range of ±0.12 mm from the mean value of longer diameter.

The length of the pellets is in the range from 2.5 to 3.5 mm on average, so that they fit with the dimensions of the cylinder and screw of the injection molder for discs. When the pellet length is less than 2.5 mm or exceeds 3.5 mm, the bite of the screw may become imperfect. When the average longer diameter the sectional ellipse of the pellets is less than 2.6 mm or exceeds 3.2 mm, the bite of the screw may become imperfect. In production of the pellets, there are generally produced the specific distributions of their length and diameter as described below. In the case of the pellets of the present invention, it is essential that usually not less than 70%, preferably not less than 72% of the pellets have a length falling within the range of ±0.08 mm from the mean value of length and a longer diameter falling within the range of ±0.12 mm from the mean value of longer diameter. If the percentage of the pellets whose length and longer diameter stay within the above-defined ranges is less than 70%, the pellets become too wide in distribution of their length and longer diameter and lose uniformity of their shape and size and the melting efficiency may be reduce at the time of plasticization and plasticization time may be prolonged.

The resin pellets are usually produced in the following way. The resin material melted in an extruder and optionally mixed with additives and other substances is extruded into strands from a die, cooled and solidified in a cooling water tank, and cut by cutting blades arranged at regular intervals which are so-called "strand cutter". More particularly, the strands are cut by movable blades and stationary blades. The pellets obtained in the manner described above are cylindroidal.

In the present invention, the distance between both cut sections of the individual cylindroidal pellets, which is equivalent to the height of the cylindroid, is expressed as length of the pellet, and the diameter along the major axis of the elliptic section is expressed as longer diameter. Length of the pellets is decided by the spacing between the cutting blades set at regular intervals, but it becomes nonuniform and forms a certain distribution depending on the thickness of the strand and the cutter mechanism. The pellet diameter is decided by the resin discharge rate of the extruder and the taking-off speed of the strand, but a wide distribution of diameter is caused when the discharge rate or the strand cooling temperature of the cooling tank is unstable.

In the present invention, as described above, the pellets have a length and a longer diameter in the defined ranges, and at the same time the distributions of length and diameter of the pellets exist in the specified narrow ranges, that is, not less than 70% of the pellets need to have a length and a longer diameter falling within the above-mentioned ranges. Various methods are available for producing the pellets having such a narrow length distribution. For instance, the size of the die opening is adjusted in relation to the resin flow rate in the die to uniformalize the size of the strands, and/or the spacing between the take-off roller and the cutter is reduced so as to prevent deflection of the cut length. Uniformalization of diameter can be attained, for example, by elevating the cylinder temperature to uniformalize the discharge rate of the extruder, or by controlling more strictly the temperature of the strand cooling tank. The length and longer diameter of the pellets are measured by slide calipers, averaging the measurements at preferably not less than 150 measuring points (i.e. measurements on not less than 150 pellets).

Since the molding material of the present invention has its pellet length and longer diameter defined in the said ranges, the pellets have a well-balanced cubic figure with the ratio of the length to longer diameter being about 0.7 to 1.5, and they are also very uniform in shape as their length and longer diameter distributions exist within the specific narrow ranges. Consequently, not only the pellet shape fit with the cylinder and screw mechanism of the injection molder for discs, but also the melting efficiency in the plasticization operations is elevated and the plasticization time is shortened, so that it is possible to produce the preferred optical discs by featuring a short molding cycle. Further, because of the pellet shape with good balance of length and longer diameter, the metering time in short tact time molding of the optical discs is shortened, so that it is not necessary to conduct high-speed rotation of the screw for metering of the feed and it is possible to minimize the risk of inducing silverstreaks on the produced discs.

Thus, molding of the optical discs by use of the pellets of uniform length and diameter according to the present invention allows reduction of the metering time in the molding process, which makes it possible to realize a reduction of the molding cycle and prevent or minimize of silverstreaks. The molding material of the present invention, therefore, has very high utility value in industrial production of optical discs.

EXAMPLES

The present invention is described below in further detail by showing the examples thereof, but it is to be understood that these examples are merely intended to be illustrative and not to be construed as limiting the scope of the invention.

EXAMPLES 1–3 AND COMPARATIVE EXAMPLES 1–3

The polycarbonate pellets used in the Examples and Comparative Examples were prepared in the following way. A polycarbonate (trade name NOVAREX 7020AD2, produced by Mitsubishi Engineering-Plastics Corporation) of the type using bisphenol A having a viscosity-average molecular weight of 14,800 as monomer was melt extruded and the strand extruded from the die was cut into pellets. The length and longer diameter of the obtained pellets were measured with slide calipers. A total of 150 pellets were measured, and the average of measurements on these pellets (150 measuring points) was determined. Also, the number of the pellets whose length fell within the range of ±0.08 mm from the mean value of length was determined and its percentage (to the total number of pellets) was calculated. Similarly, the number of the pellets whose longer diameter fell within the range of ±0.12 mm from the mean value of longer diameter was determined and its percentage was calculated.

The obtained pellets were subjected to 100-shot molding continuously under the following molding conditions to produce the 12 cm φ CD's, and the average of plasticization time (metering time) monitored by the molding machine and the molding cycle time were determined. The results are shown in Table 1.

| Molding conditions | |
| --- | --- |
| Molding machine: | DISK3, Sumitomo Heavy Machinery |
| Cylinder temperature: (from nozzle) | 260-300-300-300-300-280° C. |
| Injection speed: | 0.20 sec. |
| Cooling time: | 2.30 sec. |
| Mold temperature (° C.): | 70/70 (movable half/stationary side) |
| Meter (screw) speed: | 300 rpm |

TABLE 1

| Pellets | Example 1 | Example 2 | Example 3 |
| --- | --- | --- | --- |
| Length | | | |
| Mean value (mm) | 2.92 | 2.91 | 3.38 |
| Ratio of the pellets having length within ±0.08 mm from the mean value | 79 | 85 | 72 |
| Longer diameter | | | |
| Mean value (mm) | 3.01 | 2.80 | 2.62 |
| Ratio of the pellets having longer diameter within ±0.12 mm from the mean value | 85 | 73 | 75 |
| Metering time (sec) | 2.11 | 1.99 | 2.13 |
| Molding cycle (sec) | 3.59 | 3.59 | 3.59 |
| Silverstreak occurrence rate (%) | 0 | 0 | 0 |

TABLE 1 (CONTINUED)

| Pellets | Comp. Example 1 | Comp. Example 2 | Comp. Example 3 |
| --- | --- | --- | --- |
| Length | | | |
| Mean value (mm) | 2.93 | 3.41 | 2.94 |
| Ratio of the pellets having length within ±0.08 mm from the mean value | 55 | 65 | 85 |
| Longer diameter | | | |
| Mean value (mm) | 3.01 | 3.01 | 3.83 |
| Ratio of the pellets having longer diameter within ±0.12 mm from the mean value | 84 | 82 | 55 |
| Metering time (sec) | 3.01 | 3.11 | 3.13 |
| Molding cycle (sec) | 4.30 | 4.40 | 4.42 |
| Silverstreak occurrence rate (%) | 4 | 2 | 7 |

What is claimed is:

1. A polycarbonate molding material for optical discs, comprising pellets which comprise a polycarbonate with a viscosity-average molecular weight of 10,000 to 18,000; wherein the pellets
   have an average length of 2.5 to 3.5 mm; and
   have an average longer diameter of a sectional ellipse of the pellets of 2.60 to 3.2 mm,
   with not less than 70% of said pellets having a length within ±0.8 mm from the average length and a longer diameter within ±0.12 mm from the average longer diameter.

2. A process for producing an optical disc, comprising the steps of providing the polycarbonate molding material as set forth in claim 1, and conducting injection-molding of the polycarbonate molding material.

3. The process according to claim 2, wherein the step of conducting injection molding comprises a molding cycle time of not more than 4.0 seconds.

4. The process according to claim 2, wherein the step of conducting injection-molding comprises using a molding machine having a cylinder setting temperature of 280 to 400° C. and a mold setting temperature of 50 to 140° C.

5. The process according to claim 2, wherein the optical disc is a single disc having a thickness of 0.6 mm to 1.2 mm or a pair of said discs combined.

6. A process for using a polycarbonate molding material, comprising providing the polycarbonate molding material set forth in claim 1, and conducting injection-molding of said polycarbonate molding material, thereby producing an optical disc.

* * * * *

UNITED STATES PATENT AND TRADEMARK OFFICE
CERTIFICATE OF CORRECTION

PATENT NO. : 6,066,398
DATED : May 23, 2000
INVENTOR(S) : M. Ueda

It is certified that error appears in the above-identified patent and that said Letters Patent is hereby corrected as shown below:

Column 6, in claim 1, line 46, please change "± 0.8 mm" to -- ± 0.08 mm--.

Signed and Sealed this

Twenty-second Day of May, 2001

*Attest:*

NICHOLAS P. GODICI

*Attesting Officer*  *Acting Director of the United States Patent and Trademark Office*